Oct. 19, 1971 R. F. SCOTT 3,613,446
SELF-RECORDING ACCELEROMETER
Filed Nov. 5, 1968 4 Sheets-Sheet 1
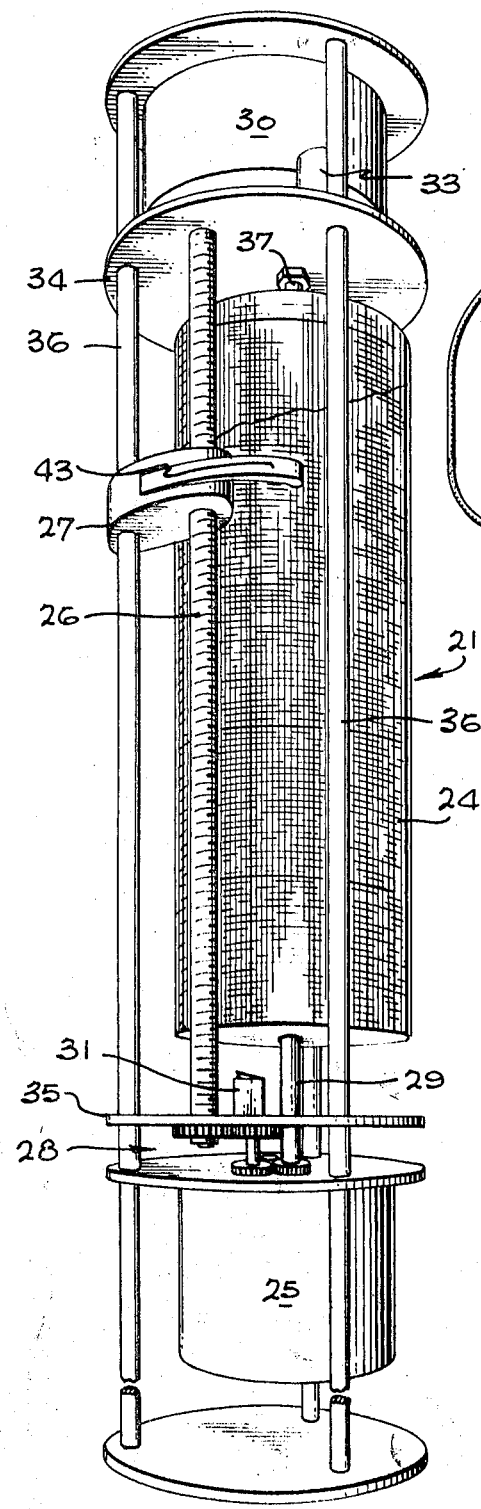
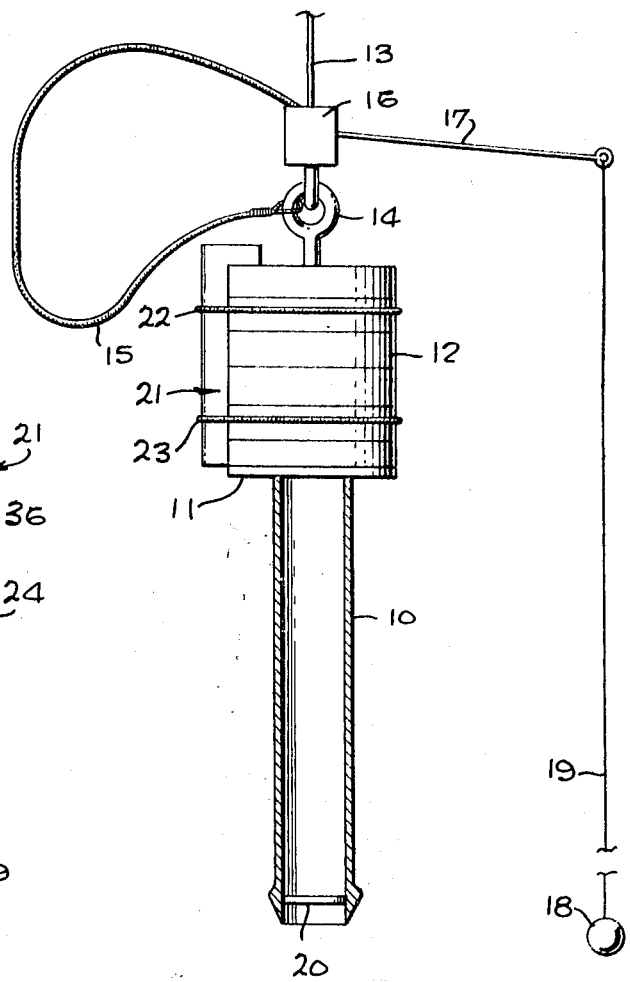
INVENTOR.
RONALD F. SCOTT
BY Lindenberg & Freilich
ATTORNEYS Oct. 19, 1971   R. F. SCOTT   3,613,446
SELF-RECORDING ACCELEROMETER
Filed Nov. 5, 1968   4 Sheets-Sheet 2

INVENTOR.
RONALD F. SCOTT
BY Lindenberg & Freilich
ATTORNEYS

RONALD F. SCOTT
INVENTOR.

Oct. 19, 1971 R. F. SCOTT 3,613,446
SELF-RECORDING ACCELEROMETER
Filed Nov. 5, 1968 4 Sheets-Sheet 4
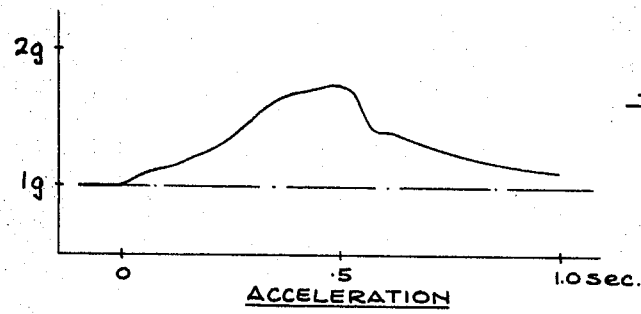
*Fig. 9*
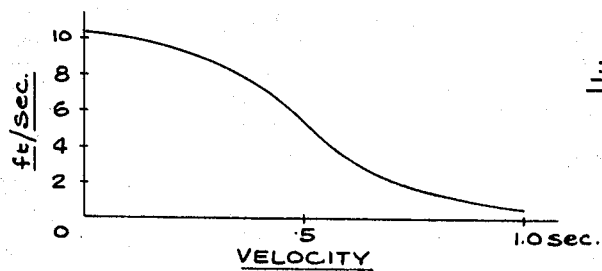
*Fig. 10*
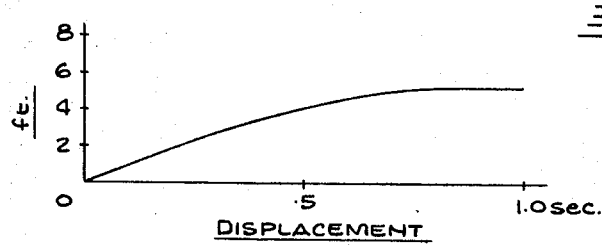
*Fig. 11*
*Fig. 12*
*Fig. 13*
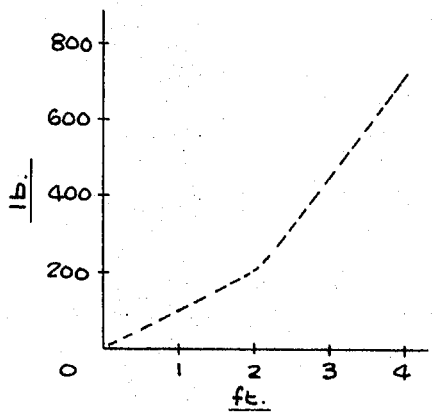
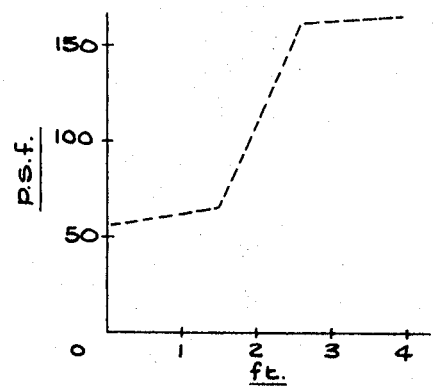
INVENTOR.
RONALD F. SCOTT
BY Lindenberg & Freilich
ATTORNEYS United States Patent Office 3,613,446
Patented Oct. 19, 1971

3,613,446
SELF-RECORDING ACCELEROMETER
Ronald F. Scott, Altadena, Calif., assignor to
California Institute of Technology
Filed Nov. 5, 1968, Ser. No. 773,489
Int. Cl. G01n 1/00; G01v 9/00; G01d 9/10
U.S. Cl. 73—170
27 Claims

ABSTRACT OF THE DISCLOSURE

A self-recording, single-axis accelerometer is provided by utilizing a mass, which moves against a bellows-type spring force, in the form of a cylinder to carry a chart. A lead screw parallel to the cylinder axis, and geared thereto, advances a stylus assembly from one end of the drum to the other as the cylinder is rotated at constant speed. When subjected to acceleration, the cylinder is displaced along its axis, thereby causing the trace of the stylus to depart from its helical path in proportion to the magnitude of the acceleration, and in a direction corresponding thereto. A method is disclosed for obtaining information on the strength of ocean-floor soils by instrumenting conventional shallow or deep-ocean sampling, coring or other apparatus with a single-axis accelerometer.

BACKGROUND OF THE INVENTION

This invention relates to apparatus for recording acceleration of an object along a single axis, and more particularly to a method and apparatus for obtaining information on the strength of soils.

A number of techniques have been employed to gain information on the physical properties of ocean-floor and other soils, including strength. Some have been applied to soil samples returned to the ocean surface, but more recently some techniques have been applied to the soil in place. Some of these techniques, as well as others, and apparatus adapted for use therein, have been summarized by the present in a paper titled "In-Place Soil Mechanics Measurements" published by the University of Illinois Press, Urbana, Illinois in Marine Geotechnique (1967) edited by Adrian F. Richards. In general, they involve both direct and indirect methods. Techniques of the latter class involve acoustic, thermal, nuclear and magnetic phenomena, while techniques of the former class involve various phenomena, the most direct of which involves estimating shearing strength of a soil from a record of penetration of a known object into the soil in response to a known force. Another technique employs a device designed and utilized for exploratory work on the moon and instrumented to make both static and dynamic tests. In the dynamic mode, a trenching implement is raised and dropped into the surface whereupon the history of deceleration during impact is recorded. Although it is conceivably possible for such an implement to be adapted for general use such as on the ocean floor, the approach is not as yet economically feasible due to the many and varied problems of placing such an implement on the soil to be tested, operating it and recovering at least the test record, if not the implement itself.

SUMMARY

In accordance with the present invention, a sampling tube (referred to hereinafter as a corer) or other device adapted for dynamic penetration of soil to be tested is instrumented for recording acceleration of the device from prior to impact, preferably under free-fall conditions, until it at least approaches its final stationary position imbedded in the soil. Later analyses of the record provide information on the soil strength, i.e., resisting force offered by the soil, by the following: integration of the acceleration-time record to provide a history of velocity, from which velocity at impact can be determined; and integration of the velocity-time data to provide displacements from which dynamic penetration can be determined. From these, resisting force is determined as a function of time, velocity and displacement. When correlated with other penetration information, the acceleration record allows the functioning of the coring apparatus to be checked and permits the dynamic behavior of the corer in free fall to be determined in addition to allowing calculation of soil resistance as a function of penetration. With some assumptions, the shearing resistance of the soil can be calculated. The present invention further provides some information on the vibrations in the cable by which the corer is attached to the ship and oscillations of the corer as the corer is lowered and raised. It also allows an estimate of the corer recovery ratio to be made.

The technique of the present invention is preferably implemented with a self-recording, spring-type accelerometer which, according to a further aspect of the present invention, is a single-axis accelerometer employing a recording cylinder as the accelerometer mass. A constant-speed drive motor at one end of the cylinder is coupled thereto through a drive shaft by the accelerometer spring. A guiding shaft at the other end of the cylinder maintains the cylinder axis in a fixed position relative to a supporting frame. A stylus secured to the frame provides a trace on a chart carried by the cylinder. That trace will follow a predetermined path when the frame is not subjected to acceleration, positive or negative. Deviation of the trace as the cylinder moves axially under acceleration is then a measure of acceleration, or deceleration.

In accordance with a further feature of the present invention, the accelerometer spring is of the bellows type disposed in one part of the record cylinder and open to the other part, the two parts being otherwise isolated by a partition which secures the bellows to the cylinder. As the cylinder moves axially relative to its supporting frame in response to acceleration in either direction, air is forced out of one part of the cylinder around the shaft thereof, either the guiding or driving shaft, while air is forced into the other part of the cylinder around the other shaft. In that manner, axial movement of the cylinder along the shafts is lubricated by air. A vibrator may be secured to the frame to keep the frame vibrating, i.e., to maintain relative motion between the frame and cylinder, thereby eliminating static friction. A needle valve may be adjusted to alter the opening of the bellows, thereby varying the damping factor of the bellows.

In accordance with still another feature of the present invention, the stylus is secured to the frame by a lead screw parallel to the cylinder axis. As the cylinder is rotated, the lead screw is rotated by the constant speed motor through a suitable gear train. The stylus is thereby caused to inscribe a helical path on the record cylinder to increase the recording time to many cylinder revolutions without interfering with the cylinder's function as an accelerometer mass.

The novel features that are considered characteristic of this invention are set forth with particularity in the appended claims. The invention will best be understood from the following description with reference to the drawings.

BRIEF DESCRIPTION OF THE DRAWINGS

FIG. 1 illustrates a sampling core barrel attached to a weight stand adapted for free-fall use by a tripping device, and instrumented with an accelerometer in accordance with the present invention.

FIG. 2 illustrates in a perspective view a self-recording accelerometer in accordance with the present invention.

FIGS. 5 to 13 are graphs that illustrate the manner in which data obtained by an instrumented corer is used to gain desired information in accordance with the present invention.

DESCRIPTION OF THE PREFERRED EMBODIMENT

Figure 2A:
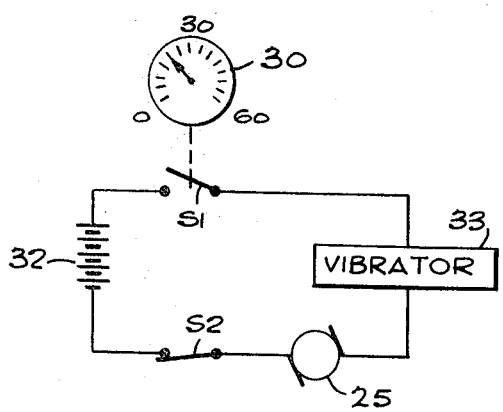
FIG. 2a shows schematically the electrical system of the self-recording accelerometer of FIG. 2.

The construction and operation of shallow-or deep-sea corers is described in the literature and will therefore not be described here except in general terms to illustrate one embodiment of the present invention. Accordingly, it should be understood at the outset that the present invention is not limited to the use of such corers. Soil strength information can be obtained with any device, such as a cone penetrometer, which penetrates along a single axis, and in any soil, whether it be on the ocean floor or not, such as on the moon. All that is required is a cable or other means for lowering the penetrating device with an accelerometer, preferably a recording accelerometer, to an approximate predetermined height above the soil, and from there to the soil at a controlled rate of descent, or preferably under free-fall conditions. After impact, the device is retrieved for analyses of its accelerometer record. Alternatively, the accelerometer may be provided with means for transmitting to the surface of the ocean the acceleration measurements if the device is not to be retrieved, or if there is appreciable risk that the device will be lost in the attempt to retrieve it.

FIG. 1 illustrates a deep-sea corer comprising a core-barrel 10, which may be up to 20 to 30 feet in length and attached to a weight-stand 11 loaded with, for example, up to 2000 lb. of lead weights 12. A cable 13 is attached to a ring 14 with a loop 15 by a tripping device 16. A tripping arm 17 is held in the position shown by a weight 18 at the end of a small cable 19. When the weight 18 reaches the ocean floor, the arm 17 moves upwardly, releasing the cable 13 through the device 16. The corer then falls freely to strike and penetrate the soil with the core-barrel 10. The resistance of the soil brings the corer to a stop with a sample of the soil in a substantial part of the core-barrel 10.

The core-barrel 10 is frequently fitted with a piston 20 (which is connected to the cable 13, or the ring 14, by an assembly not shown) in such a way that the piston 20 stops at or near the interface of the soil with the water while the core-barrel 10 slides past it. That is done for the purpose of minimizing sample disturbance. The assembly then holds the piston at its uppermost position of travel when the corer is returned in order that the sample will remain in the corer. If the soil sample is not desired, the piston may be omitted or, as noted hereinbefore, the core-barrel 10 may be replaced with a nonsampling penetration device, such as a solid rod or a cone penetrometer.

In accordance with the present invention, the corer is instrumented with an accelerometer 21 in order to record its motion during penetration into the soil. Since the resistance of the soil brings the corer to a stop, the acceleration record will provide data from which resistance and shearing strength of soil may be determined. Other information about the sampling and extraction processes is also provided by the record.

The accelerometer 21 is preferably a self-recording instrument hermetically sealed in a suitable pressure casing. It is secured to the weights 12 on the stand 11 by straps 22 and 23. The instrument may be placed in a cutout along one side of the weights as shown for simplicity (if the weights are provided with such cutouts on both sides for proper balance); otherwise, the instrument could be strapped on the outside of the weights. In either case, the arrangement interferes with the hydrodynamic stability of the corer. Accordingly, for best results, an arrangement in which the instrument is retained in the center of the weights is preferred, and has been used.

The self-recording accelerometer 21 will now be described with reference to FIGS. 2, 3 and 4. The perspective view of the instrument in FIG. 2 is without its pressure casing. It consists of a chart cylinder 24 driven at a constant speed by a chronometrically governed DC motor 25. An electrical timing device may be used to so activate, deactivate, or actuate the recording stylus thereof as to provide timing marks as a check on the motor speed, if desired. Since an approximate analysis of the motion of a corer penetrating up to as much as twenty feet indicates that penetration periods will last up to several seconds at peak decelerations of 0.5 to 2 times gravitational acceleration, a chart speed of several centimeters per second is required to clearly discriminate the acceleration record. At that speed many meters of record will be required to insure that impact will be recorded since the time at which impact will occur may have a range of uncertainty of as much as 10 to 15 minutes. Accordingly, a helical track on the cylinder is provided for the trace in a manner well known to those skilled in the art by a lead screw 26 which advances a stylus carriage 27 at a uniform rate as the record cylinder 24 is rotated. A mesh of gears 28 provide the proper reduction between the motor 25, the lead screw 26 and a chart drive shaft 29. It should be understood that although the chart is shown as the surface of the cylinder 24 for simplicity, in actual practice the chart is a sheet of suitable recording material secured on the surface of the cylinder 24 in a well known manner.

As many as 15 to 30 minutes are normally required to lift the corer over the side of a ship and to lower it to the ocean floor. A timer 30 is provided to set the time the drive motor 25 is to commence operation. With the lowering speed of the ship's winch known, the time at which the corer will then reach bottom can be estimated (15 to 30 minutes in a few thousand feet of water). The record cylinder 24 will typically provide only about 15 minutes of recording time with a helical trace. Accordingly, the timer 30 is set to commence operation about 5 minutes before the earliest expected impact with the ocean floor. When the stylus carriage 27 has reached the other end of the cylinder 24, it actuates a microswitch 31 to stop the motor. FIG. 2a shows a diagram of the electrical circuit. Switch S1 is actuated by the timer to connect a battery 32 (normally stored below the motor 25 as viewed in FIG. 2, but not shown) to a vibrator 33 in series with the motor 25. Switch S2 then opens the circuit when the microswitch 31 shown in FIG. 2 is actuated.

The vibrator 33 is mounted on the instrument frame at any convenient place, such as just below the timer 30 as shown in FIG. 2. Its function will be described with reference to FIG. 3. The instrument frame consists of a plurality of discs, such as discs 34 and 35, held spaced apart by at least three equidistant rods, such as rod 36.

Figure 3:
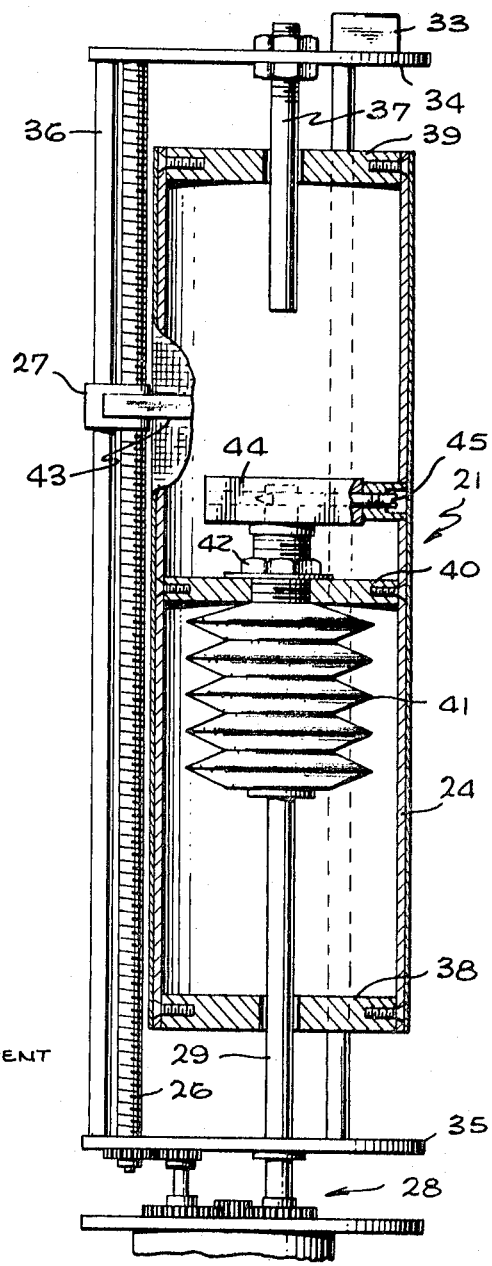
FIG. 3 illustrates in greater detail the more important elements of the accelerometer of FIG. 2, some in cross section.
Figure 4:
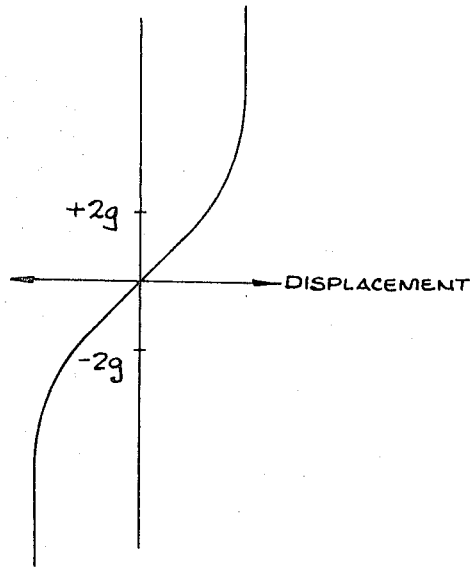
FIG. 4 illustrates the characteristic response of a bellows-type spring to acceleration of a mass attached thereto in a manner shown in FIG. 3.

Referring now to FIG. 3, while one end of the cylinder 24 is supported by a drive shaft 29 passing through and journaled in the disc 35, the other end of the cylinder 24 is supported by a stationary guide shaft 37. However, neither shaft is attached to the ends of the cylinder 24 in order that the cylinder may move freely in response to axial motion of the instrument. End discs 38 and 39 have center holes for the shafts 29 and 37. Each hole is slightly larger than the shaft passing through it to allow free motion of the cylinder.

A third disc 40 separates the cylinder 24 into two parts. The lower part contains a bellows-type spring 41 having one end closed and fixedly attached to the drive shaft 29, and the other end open to the upper part of the cylinder and fixedly attached to the disc 40 by a nut 42 with a suitable seal. As the cylinder moves up and down, air is pumped in and out of the upper part of the cylinder 24 by the bellows forcing air in and out around the shaft 37 to provide an air bearing around it for free rotation and axial motion of the cylinder. The bellows similarly forces air out and in around the shaft 29 to provide an air bearing. In that manner, the cylinder 24 functions as the mass of a spring-type accelerometer working against the bellows-type spring.

For an instrument to perform as an accelerometer, it is necessary for the natural period of the device to be short in comparison with the period of the excitation. In comparison with the time duration of penetration, it was apparent that an instrument natural frequency of 5 cycles per second or higher would suffice. When a suitable mass and spring had been selected to give this value, the acceleration scale was in the range of 0.5 to 1 cm./g. It was decided, therefore, that since a suitable chart paper and stylus could be obtained, no mechanical magnification of the trace was needed during the operation. Instead, post-experiment photographic enlargement was employed.

A pressure sensitive chart paper was preferred in order that the stylus carriage 27 be provided with an arm 43 not encumbered with electrical wires required by chart paper sensitive to heat or electricity. However, it should be understood that any suitable chart paper may be employed, even paper for ink recording since the pressure casing (shown generally in FIG. 1 for the instrument 21) is hermetically sealed. For example, a ball-point pen may be attached to the stylus arm 43 since it will record very well in a horizontal position (but not for long in an inverted position). It should be further understood that with each choice of chart paper and stylus, the stylus arm is to be suitably biased against the chart paper with whatever force is required for best results. Accordingly, the stylus arm 43 is shown in FIG. 2 as a leaf spring curved toward the cylinder 24 sufficiently for it to bear against the surface thereof with the appropriate force. The stylus itself is then provided as a pointed end of the stylus arm. Other more appropriate stylus and stylus arm assemblies may be readily provided on the carriage 27 by those skilled in the art to meet particular environments and operating requirements.

Because the accelerometer is likely to be subjected to rough handling at sea, and because impact may occur on a hard or rocky bottom, a nonlinear stiffening spring element was selected, and stops were provided by discs 34 and 35 to limit the travel at distances corresponding to plus or minus several $g$'s. Since the ultimate analysis of the acceleration record is performed by a computer, the nonlinear behavior of the stiffening spring element does not complicate the analysis enough to be burdensome once the computer program is prepared. In any case, the spring characteristic of the bellows-type spring is sufficiently linear within the range of acceleration to be experienced in a core sampling operation, as shown in FIG. 4. A needle valve 44 is connected to the open end of the bellows to adjust its damping factor. The position of a needle in the valve is adjusted by turning a threaded end 45 of the valve needle in a recessed cup with a small screw driver from outside the cylinder. Other adjustment means may be employed.

Since the air bearings around the shafts 29 and 37 are effective only while the cylinder is in axial motion, and static friction may be a significant factor in the operation of the instrument, the vibrator 33 is attached to the disc 34 to maintain the instrument in continual motion while the switches S1 and S2 (FIG. 2a) are closed.

Once the instrument has been secured to the corer as shown in FIG. 1, and the cable 13 has been secured to the tripping device 16 with the loop 15, the entire assembly is hoisted over the side of a ship and lowered into the water at a station directly over the location where a sample is to be obtained. Sonar on board the ship indicates the approximate water depth. With the lowering speed of the ship's winch known, the approximate time at which the corer will reach bottom can be estimated. As noted hereinbefore, the clock timer 30 is then set to start the instrument motor 25 at about 5 to 10 minutes before the device 16 is tripped to release the corer 10 for free fall to and penetration of the soil during the remaining time of the recorder. If the corer 10 is retrieved before the recording time has expired, a record of the extraction and recovery motion is also provided.

As noted hereinbefore, the record of the motion during lowering, triggering, free-fall, impact and penetration is recovered as a trace which follows a helical path but deviates therefrom as motion of the corer along its vertical axis causes the cylinder 24 to move axially. Penetration is followed by a portion of the trace which does not deviate from the helical path, indicating unit gravity while the corer is at rest imbedded in the ocean floor soil. Finally, motions during extraction and recovery are observed as deviations of the record trace from the helical path.

Figure 5:
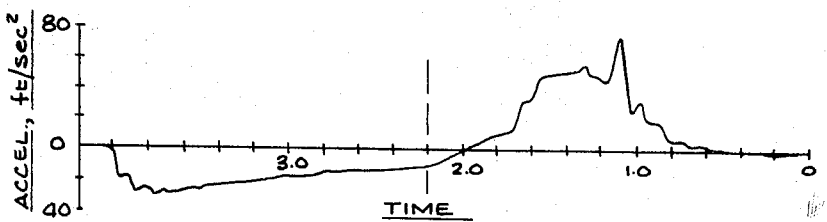

Since the period of rest may be readily identified in the recorded trace, the record of free-fall, impact and penetration can be readily identified. Such a record of a typical core sampling operation without a core-barrel piston at a water depth of 6180 feet is shown in FIG. 5 with time indicated before the initiation of the rest period which is not shown. The core-barrel was 21 feet long and had an inside diameter of 2.125 inches. The outside diameter was 2.875 inches. At the left hand end of the record, the acceleration is shown to be zero (due to gravity alone) for nearly 0.2 secs. as the corer is being lowered. Then the corer is tripped, the acceleration becomes less than gravity (almost minus unit $g$ as the diagram is plotted) as free fall begins, and the corer velocity increases. Next, the velocity continues to increase, but the acceleration gradually decreases as hydrodynamic resistance takes effect. Were free fall to continue long enough, the acceleration would diminish to zero again (unit $g$) as the corer reached terminal velocity. However, in this case, it is surmised that the core barrel made contact with the ocean floor at about 2.2 seconds on the record, so that acceleration diminished to zero, and then the corer began to decelerate. Ultimately the deceleration ceased when the corer was at rest in the sediment.

The lack of sensitivity of the acceleration to the instant of contact with the soil in this case was caused by the weight of the corer (1100 lbs.) and, of course, the softness of the sediment. The spike on the acceleration trace at 1.1 secs. is thought to be due to the impact of the weight stand of the corer with the soil.

Figure 6:
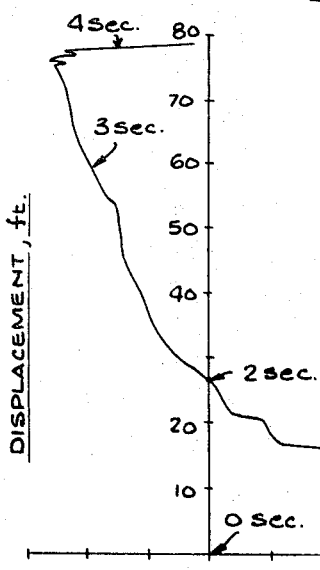

In FIG. 6 the acceleration is plotted against displacement to show the compression of the acceleration curve that occurs as the motion comes to a stop. In the sampling process represented by FIGS. 5 and 6 only 4.75 ft. of core was retrieved.

Analysis of the record illustrated in FIG. 5 will now be described with reference to FIGS. 7 and 8. In actual practice, smaller weights may be used with free-fall sampling to produce a pronounced deceleration event upon contact with the soil, and to not produce a weight-stand-impact trace, but the record of FIG. 5 will illustrate the technique. That record has been traced from a chart and amplified optically for clarity. A planimeter was then used to obtain the integral of the acceleration-time record of FIG. 5, beginning from the right-hand side (time 0) where the apparatus came to rest in the ocean-floor soil; however, other means may be employed to obtain the same integral. After time 0, the accelerometer continued to record unit $g$ acceleration until extraction and recovery was started.

Figure 7:
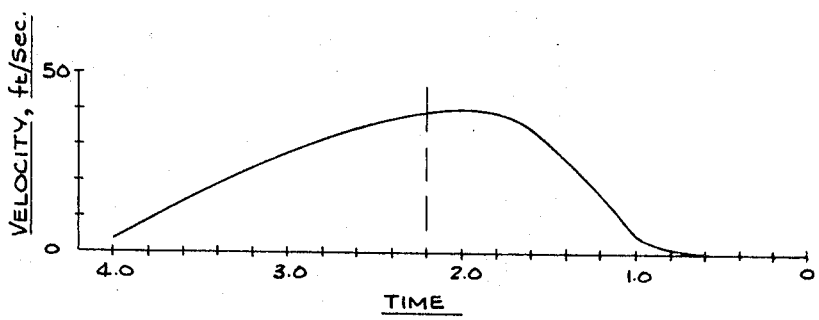

Integration of the acceleration-time record of FIG. 5, incorporating the time and acceleration constants of the corer and instrument assembly, provides the velocity-time diagram of FIG. 7. This is possible by integrating the curve of FIG. 5 starting from the right since the velocity is known to be zero when the corer came to rest at time 0. From this diagram of FIG. 7, the velocity of the corer at impact (contact) is obtained.

Figure 8:
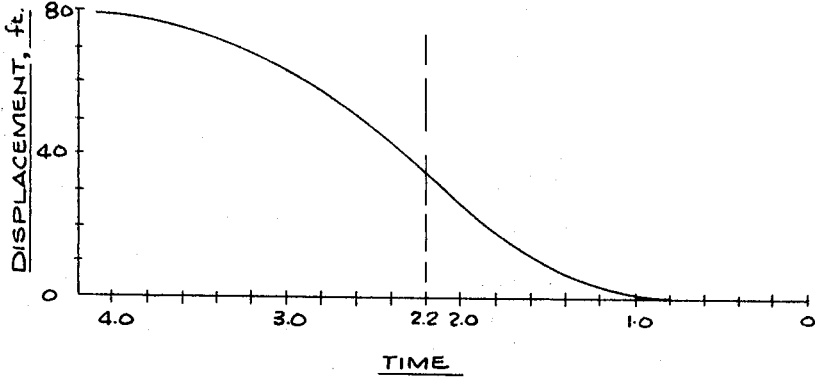

Integrating the velocity curve of FIG. 7, again starting from the right, provides a displacement history shown in FIG. 8. That history indicates, among other things, that penetration of about 35 feet had occurred from initial impact (contact) up to the time 0 when the accelerometer indicated the corer had come to rest, and yet the corer-barrel length was only 21 feet, which confirms that at time 1.1 seconds of the acceleration diagram of FIG. 5, the weight-stand impacted against the ocean floor.

The length of the sample core recovered was 4.75 feet, from which the recovery ratio can be determined. The small ratio of 4.75:21 is due to the use of a core barrel without a piston and too much weight on the stand for the strength of the soil sampled.

Since the displacement-time behavior of the corer is known from FIG. 8, and the velocity of the corer is known from FIG. 7 at the time of impact (contact) and for the remainder of the penetration period, the soil resistance can be determined as presented herein and plotted against penetration (or against velocity if that might be of interest). If it is assumed that the soil resistance develops as a result of soil shearing along both the inside and the outside surfaces of the coring tube, as it may in the case of thin-walled core barrels, inertial forces may be ignored and the soil resistance plotted against penetration can be converted to a shearing resistance and plotted against penetration. However, at some depth of penetration, the soil may, on occasion, cease to flow into the core barrel during penetration, particularly if stiffer soil is encountered, and instead be displaced by the rather broad end of the barrel. Determination of shearing strength from that point of penetration on becomes more difficult and only the total resistive force may be ascertained.

On occasion, smaller corers (weighing only a few hundred pounds with weights) are used without any free fall before impact. These enter the soil on the ocean floor at essentially the cable lowering velocity of a few feet per second. In that case, the resisting force to the motion on impact is no longer just due to the soil, as in the case of free fall. The weight of all corers in fairly deep water extends the lowering cable elastically several feet, so that, on release of the weight by tripping or through impact with the sea-floor, the cable contracts elastically. In the case of the corer without free fall, this means that an unknown but diminishing force applied by the cable acts through at least the initial few feet of penetration. A method of estimating this force is presented herein, but the accuracy of determination of the soil resistance is not as good as in the case involving free fall.

When the free-fall apparatus is used, tripping takes place so suddenly that an elastic longitudinal wave runs up the cable to the ship, is reflected at the winch and returns to the corer at the sea floor. This only takes a few seconds, but if impact has already occurred, it can have the effect of pulling the core barrel out of the soil into which it is penetrating, and releasing it into the soil again. In the case of soil sampling without free fall, there is only the diminishing force of the cable working against penetration.

A record of a corer penetration without free fall is shown in FIG. 9. It will be analyzed in some detail to further illustrate the present technique of instrumenting a corer with a single-axis accelerometer. However, no attempt will be made to give a refined analysis of the data since such would involve variables of the particular instrumented corer. Instead, only a brief outline of the salient features applicable in most situations is presented.

The record shown in FIG. 9 was obtained with an instrumented corer weighing 480 lbs. and having a 3-inch core-barrel diameter. On the actual chart, the impact trace had a magnitude of about 5 mm., but it was magnified to the scale shown. The integral of the acceleration-time record was then obtained from the magnified chart, again beginning from the far right at the time the accelerometer had come to rest. In FIG. 9, the trace is cut off before that time was reached, but it was used as the starting point in the actual integration. Thus, integration incorporating the time and acceleration constants of the instrumented corer yields the velocity-time diagram of FIG. 10. As shown, integration has been carried back only to the time of impact (time 0 in the acceleration-time diagram), at which time velocity is determined to be slightly over 10 feet per second. Integrating the velocity curve yields the displacement history shown in FIG. 11. In this case, total penetration was about 5 feet.

The length of core recovered was 3.6 feet, from which the indicated recovery ratio can be determined. It is possible for the corer to creep further into the soil at a rate below the limit of resolution of the instrumented corer. Actual penetration would then be greater to reduce the indicated recovery ratio still further.

In the operation under discussion, no free fall occurred, so that, at the instant the core-barrel touched the soil during the lowering operation, the cable was stretched an amount depending on its elastic stiffness and the weight of the core barrel and cable in water. As the barrel penetrated into the soil, its weight was gradually transferred to the soil, and thus the force on the cable due to the weight of the corer diminished with penetration, and the cable contracted. Since it takes a few seconds before impact is recognized and the winch shut down, the upper end of the cable continues to be payed out at the pre-impact velocity during the penetration process. In order to estimate the resisting force of the soil on the core barrel in this case, it is necessary to compute the variation of the cable force with time during penetration as the stretched cable begins to contract.

To do this, the stiffness of the cable has to be determined. Since this was not measured directly for the cable used, it was obtained indirectly as follows. On the actual chart (not shown), it could be seen that there were oscillations of two different frequencies on the accelerometer before impact. The higher frequency vibrations are due to the winch operation and are propagated up and down the cable at the speed of sound in the cable. Unfortunately there is so much noise of this kind in the cable that reflections of these perturbations cannot be definitely identified. If they could, it would be possible to use the times between such signals together with the length and mass per unit weight of the cable to get its elastic modulus. It might be feasible to do this deliberately, by sending a definite signal down the cable as by striking the cable or crane. The longer period motions before impact are vertical oscillations of the corer on the end of the elastic cable resulting from the motions of the boat. It is assumed here that they are simple harmonic motion; their circular frequency $\omega$ could be determined from the record to be 4.84 rad/sec as an average of several such oscillations. Assuming no damping, and neglecting the cable, the cable stiffness $k$ can be obtained from the equation $$k = m\omega^2 \qquad (1)$$

where $m$ is the mass of the corer. Damping could be included, and would be where free-fall corers are used, since the accelerometer record can be used to estimate the drag coefficient of the corer.

It is found from this calculation that $k$ was equal to 350 lb./ft. for the cable length in use. The water depth at this location was 2000 ft. which will be assumed to be the cable length, although the latter will always, in practice, be greater. Estimates of the stiffness based upon known properties of other cables indicate that the above value of $k$ is reasonable.

Using the value of 350 lb./ft. and the 480-lb. weight of the corer (neglecting water buoyancy) gives an extension of 1.37 ft. for the cable due to the corer alone. Consequently, during penetration, as the cable extension diminishes, there will initially be two forces due to the cable tension and the soil resistance (neglecting hydrodynamic drag) on the corer. After the reduction in cable length reaches 1.37 ft., the cable force becomes zero, and only soil resistance remains.

In the present illustrative case, the record indicated that no oscillations were taking place at impact, so that at the instant of contact ($t=0$) of the core barrel with the soil it will be assumed that the total cable extension was $x_0$. At this time an imaginary marker at the top of the cable is moving down with velocity $v_i$, as is the corer. This velocity $v_i$ is the velocity at impact ($t=0$) from FIG. 10. A short time $t$ later, but before the force in the cable due to the corer has relaxed completely, the change in extension $\Delta x$ of the cable is due to the difference between the distance the marker at the top of the cable has moved down, and the distance the core barrel has moved:

$$\Delta x = \int_0^t v_i dt - \int_0^t v dt \qquad (2)$$

where $v$ is the velocity of the core barrel. However, $v_i$ is known and constant, and the displacement, $z$, of the corer from the soil surface is known from FIG. 11, so that Eq. 2 becomes $$\Delta x = v_i t - z \qquad (3)$$

Thus, the extension, $x$, of the cable as a function of time, where $0 < x < 1.37$ ft. can be expressed as follows:

$$x = x_0 - \Delta x$$
$$= x_0 - (v_i t - z) \qquad (4)$$

Now the equation of motion of the corer during the time in which the tension in the cable is acting on it is $$m\ddot{z} = mg - P - F \qquad (5)$$

where $z$, the displacement, is taken positive downwards, $\ddot{z}$ is the acceleration, F is the force of the resistance of the soil to penetration and P is the force of the cable acting on the corer, where $$P = kx \qquad (6)$$

The hydrodynamic resistance of the water to the motion of the corer through it should also be included, but this is neglected here for simplicity. If the drag of the corer is known (it can be determined from the acceleration record when the corer is of the free-fall type), the hydrodynamic resistance can be added to the equation, since the velocity is known from the integration of the acceleration record.

Substituting for P and $x$ from Eqs. 4 and 6 in Eq. 5 gives $$m\ddot{z} = mg - k[x_0 - (v_i t - z)] - F \qquad (7)$$

However, since the initial extension at the moment of impact is $x_0$, it follows that $$kx_0 = mg \qquad (8)$$

so that Eq. 7 becomes $$m\ddot{z} = k(v_i t - z) - F \qquad (9)$$

Equation 9 can be rearranged to give F, the soil resistance $$F = k(v_i t - z) - m\ddot{z} \qquad (10)$$

In Eq. 10, since $z$ is measured positively downward from the soil-water interface, $\dot{z}$, the velocity, is positive downwards and $\ddot{z}$ is positive when the velocity is increasing downwards. Thus the accelerations recorded in FIG. 9 are negative, since the velocity of the corer was decreasing following impact with the soil at time $t$ equal to zero.

As penetration increases, the term in square brackets in Eq. 7 decreases to zero, so that the cable tension due to the corer becomes zero. From this time on, if penetration continues, the equation of motions is $$m\ddot{z} = mg - F \qquad (11)$$

which can be rearranged, as before, to give the soil resistance $$F = mg - \ddot{z} \qquad (12)$$

Since $m$ and $g$ are known, $k$, $v_i$ and $t$ are calculated, and $z$ is measured, the soil resistance F can be determined at all stages of the motion. The resistance can be plotted as a function of time, or, more appropriately, since the displacement-time behavior of the corer is also known from FIG. 11, it can be shown versus depth of penetration as in FIG. 12 (or against velocity, if that might be of interest).

As in the case of free-fall penetration, if it is assumed that the soil resistance develops as a result of soil shearing along both the inside and outside surfaces of a thin-walled core barrel, inertial forces may be ignored and the soil resistance can be converted to a shearing resistance as shown in FIG. 13. However, again as in the case of free-fall penetration, it frequently happens that at some depth of penetration, or if a stiffer soil layer is encountered, the soil ceases to flow into the core barrel during penetration and is instead displayed by the plugged barrel, making the determination of a shearing strength more difficult.

From the foregoing it may be seen that the measurement of deceleration need not be confined to core sampling processes, and that, as noted hereinbefore, the accelerometer will give information on soil resistance, or relative density, when it is attached to any penetration device such as a piece of soil rod, or cone penetrometer. However, the penetration process must take place approximately in the axial direction of the accelerometer so that a device which falls stably (in water, air or other medium) and penetrates without overturning is required. However, if it does overturn, such occurrence will be reflected in the record and assist proper interpretation of the core sample obtained, if any.

It sometimes happen that the corer will impact the soil in such a way that it bounces out of the soil after substantial penetration, only to impact again in an adjacent area with further substantial pentration. Without an accelerometer record, the core sample will appear to repeat itself causing the researcher to be at least temporarily misled to believe that some disturbance has caused a part of the floor being tested to be redeposited on another part. Thus, an accelerometer trace will not only provide an inplace measurement of the resistance and shearing strength of soil, but also assist in the interpretation of core samples.

For some particular applications it may not be desirable or possible to retrieve the accelerometer record from the pentration device. In that event, the technique of inplace soil strength measurement described herein may still be used by providing a suitable data transmission system to transmit the acceleration data. The self-recording accelerometer described herein, or other suitable accelerometer employed, would then require the necessary modifications. It should, of course, be understood that if the accelerometer is to be retrieved, the self recording accelerometer disclosed herein is preferred because it has many self-evident advantages, such as reliability, low cost, etc. However, the technique of inplace soil strength measurement may be practiced with accelerometers of other form.

What is claimed is:

1. A self-recording accelerometer comprising:
   a hollow cylinder adapted to receive a chart on the outside surface for recording thereon, said cylinder having a first disc at one end thereof, a second disc at the other end thereof and a third disc between said first and second discs, each of said discs being secured to said cylinder with the axis thereof coincident with the axis of said cylinder, and each of said first and second discs having a hole through the center thereof;
a motors;
a driven shaft rotated by said motor, said drive shaft having its axis coinncident with the axis of said cylinder and extending into said cylinder through the hole in said first disc;
a spring having elasticity along a predetermined straight line, said spring being disposed within said cylinder with said line of elasticity substantially along the axis of said cylinder, said spring connecting said third disc to the end of said drive shaft to translate rotary motion of said drive shaft to said cylinder, and to allow said cylinder to move axially against the retaining force of said spring in response to acceleration of said drive shaft in either direction along the axis thereof, whereby said chart bearing cylinder functions as an accelerometer mass;
a guide shaft having its axis coincident with the axis of said cylinder, said shaft extending into said cylinder through the hole in said second disc;
a supporting frame for said motor and shafts; and
means connected to said supporting frame for carrying a stylus in contact with said cylinder for recording on said chart.

2. A self-recording accelerometer as defined in claim 1 wherein said spring is of the bellows type and said third disc is provided with a passage through which air is forced as said bellows is expanded and contracted.

3. A self-recording accelerometer as defined in claim 2 wherein said third disc provides a seal isolating one side of said cylinder from the other, and said first and second discs provide a seal along said cylinder wall at each end thereof, whereby as said bellows is expanded and contracted air is forced out of and into one part of said cylinder through the hole in said first disc around said drive shaft to provide an air bearing, and air is forced into and out of another part of said cylinder through the hole in said second disc around said guide shaft to provide an air bearing.

4. A self-recording accelerometer as defined in claim 3 including a vibrator secured to said frame to subject said drive shaft to continually reversing acceleration, said acceleration being small relative to accelerations of said frame due to external forces, whereby static friction of said first and second discs against said drive and guide shafts is eliminated.

5. A self-recording accelerometer as defined in claim 2 including means for adjusting the size of said passage, whereby the damping factor of said bellows-type spring may be adjusted.

6. A self-recording accelerometer as defined in claim 1 wherein said means comprises a lead screw having its axis parallel to the axis of said cylinder, a stylus carriage threaded in said lead screw, and means for rotating said lead screw in synchronism with said drive shaft at a desired rate with respect to the rate of rotation of said cylinder, whereby a trace is recorded by said stylus along a helical path on said chart.

7. A self-recording accelerometer as defined in claim 6 wherein said motor is an electrical motor, and including:
a source of electrical power for said motor; and
timing means for connecting said source of power to said motor after the lapse of a predetermined span of time.

8. A self-recording accelerometer as defined in claim 7 including means responsive to said stylus carriage for disconnecting said source of power from said motor when said stylus carriage has been advanced by said lead screw along said cylinder to a predetermined position on said lead screw.

9. A self-recording accelerometer as defined in claim 8 wherein said spring is of the bellows type and said third disc is provided with a passage through which air is forced as said bellows is expanded and contracted.

10. A self-recording accelerometer as defined in claim 9 wherein said third disc provides a seal isolating one side of said cylinder from the other, and said first and second discs provide a seal along said cylinder wall at each end thereof, whereby as said bellows is expanded and contracted air is forced out of and into one part of said cylinder through the hole in said first disc around said drive shaft to provide an air bearing, and air is forced into and out of another part of said cylinder through the hole in said second disc around said guide shaft to provide an air bearing.

11. A self-recording accelerometer as defined in claim 10 including a vibrator secured to said frame to subject said drive shaft to continually reversing acceleration, said acceleration being small relative to accelerations of said frame due to external forces, whereby static friction of said first and second discs against said drive and guide shafts is eliminated.

12. A self-recording accelerometer as defined in claim 11 including means for adjusting the size of said passage, whereby the damping factor of said bellows-type spring may be adjusted.

13. A method for obtaining information on the strength of a soil by instrumenting a core-sampling device with a single axis accelerometer, lowering said device to a predetermined height above the soil, causing said device to fall freely under the force of gravity onto the soil, recording acceleration in the direction of penetration of the soil by said device along said axis from at least the time free fall is initiated to a time after said device reaches substantially zero velocity in the soil in order to analyze the penetration of the soil by said device, and obtaining a core of soil as a sample with said penetration device.

14. A method as defined in claim 13 including the technique of programming the recording of acceleration whereby a record is obtained regardless of the motion of said device in order to be able to analyze the free fall of said device and its penetration of the soil.

15. A method as defined in claim 13 including the technique of recording acceleration of said device as it is being lowered.

16. A method as defined in claim 13 wherein the analysis of said penetration of soil by said device includes:
integration of recorded acceleration with respect to time in reverse starting at some point after it appears said device had reached a position of substantially zero velocity in order to obtain a record of velocity with respect to time thereby establishing within tolerable limits the time of zero velocity and velocity at the time of contact of said device with the soil; and
integration of said record of velocity with respect to time in reverse starting at the time of zero velocity indicated by said record of velocity, thereby establishing within tolerable limits the depth to which said device penetrated the soil as the displacement from a final position of rest of said device at the time the acceleration record indicates impact of said device with the soil, said time of impact being relative to the time said device first comes to rest as determined from said velocity record.

17. A method as defined in claim 16 wherein said analyses includes determination of resistance to penetration of said device exerted by the soil.

18. A method as defined in claim 17 wherein said resistance is determined as a function of depth of penetration of said device, and said depth is determined by the length of said core sample obtained.

19. A method as defined in claim 16 wherein said analyses includes determination of shearing strength of the soil.

20. A method as defined in claim 19 wherein said shearing strength is determined as a function of depth of penetration of said device.

21. A method as defined in claim 16 including the technique of lowering said device to a predetermined height above the soil, and then causing the device to fall freely under the force of gravity.

22. A method as defined in claim 21 including the technique of programming the recording of acceleration whereby a record is obtained regardless of the motion of said device in order to be able to analyze the free fall of said device and its penetration of the soil.

23. A method as defined in claim 22 including the technique of interpreting the acceleration record as to events occurring during the recording period.

24. A self-recording accelerometer comprising:
a supporting frame;
a drive motor connected to said supporting frame;
a cylinder mounted for free axial motion in said frame;
means connecting said drive motor to said cylinder for translating rotary motion from said drive motor to said cylinder, and for restraining axial motion of said cylinder in either direction with a force proportional to axial displacement of said cylinder from a neutral position; and
means for holding a stylus in contact with said cylindrical mass including a stylus carriage constrained to move along a line parallel to the axis of said cylinder, and means for moving said carriage along said line from one part of said cylinder to another while said cylinder is being rotated, whereby said cylinder functions as a recording cylinder for recording in a helical path.

25. A self-recording accelerometer comprising:
a recording clyinder;
a drive shaft;
a spring having elasticity along a straight line;
means for coupling one end of said spring to said recording cylinder;
means for coupling another end of said spring to said drive shaft;
a supporting frame;
means connected to said supporting frame for rotating said drive shaft about its axis;
means connected to said supporting frame for guiding said cylinder in axial motion relative to said frame while it rotates about its axis in response to rotation of said drive shaft, said guiding means including a first disc having a centered hole, and a second disc having a centered hole, said first disc being connected to said cylinder at one end with the axis of said cylinder passing through the center of said hole in said first disc, said second disc being connected to said cylinder at another end with the axis of said cylinder passing through the center of said hole in said second disc with said drive shaft passing through said hole in said second disc, and a guide shaft secured to said supporting frame, said guide shaft passing through said hole of said first disc, said guide shaft having its axis aligned with the axis of said drive shaft, whereby said recording cylinder is guided for axial motion substantially along the axis of said drive shaft while said drive shaft rotates said cylinder; and
means for carrying a stylus in contact with said recording cylinder, whereby said recording cylinder functions as an accelerometer mass while said stylus traces a record of acceleration of said frame on said cylinder.

26. A self-recording accelerometer as defined in claim 25 wherein said carrying means includes means for moving said stylus in a line parallel to the axis of said recording cylinder from one part of said cylinder to another while said cylinder is being rotated, whereby said stylus traces a record of acceleration on a helical path around said axis.

27. A self-recording accelerometer comprising:
a supporting frame;
a cylinder mass adopted to receive a recording chart on the cylindrical surface thereof;
a spring having elasticity along a straight line, said spring being disposed with said straight line substantially coincident with the axis of said cylindrical mass, and one end of said spring being connected to said mass;
means rigidly attached to said frame and connected to the other end of said spring for rotating said mass about its axis through said spring, whereby said mass may be caused to rotate while it is free to move axially against a restraining force of said spring in response to acceleration of said frame; and
means for carrying a stylus in contact with said cylindrical mass, including means for moving said stylus along a line parallel to the axis of said recording cylinder from one part of said cylinder to another while said cylinder is being rotated at a rate proportional to the rate of rotation of said recording cylinder whereby said cylindrical mass functions as a cylinder for recording on a helical path while it moves axially in response to acceleration of said frame.

References Cited

UNITED STATES PATENTS

| | | | |
|---|---|---|---|
| 2,704,202 | 3/1955 | Rhoades | 73—84 X |
| 3,298,222 | 1/1967 | Costello et al. | 73—84 |
| 3,366,966 | 1/1968 | Clark | 346—7 |

FOREIGN PATENTS

| | | | |
|---|---|---|---|
| 1,467,905 | 12/1966 | France | 346—7 |

JAMES J. GILL, Primary Examiner

U.S. Cl. X.R.

73—84, 421; 346—7